(12) United States Patent
Choi et al.

(10) Patent No.: US 10,396,334 B2
(45) Date of Patent: Aug. 27, 2019

(54) BATTERY MODULE AND BATTERY PACK COMPRISING SAME

(71) Applicant: LG CHEM, LTD., Seoul (KR)

(72) Inventors: Jong-Woon Choi, Daejeon (KR); Dal-Mo Kang, Daejeon (KR); Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 228 days.

(21) Appl. No.: 15/128,778

(22) PCT Filed: Mar. 6, 2015

(86) PCT No.: PCT/KR2015/002212
§ 371 (c)(1),
(2) Date: Sep. 23, 2016

(87) PCT Pub. No.: WO2015/152527
PCT Pub. Date: Oct. 8, 2015

(65) Prior Publication Data
US 2017/0125774 A1    May 4, 2017

(30) Foreign Application Priority Data

Mar. 31, 2014  (KR) .................. 10-2014-0037969
Mar. 6, 2015  (KR) .................. 10-2015-0031449

(51) Int. Cl.
*H01M 2/20* (2006.01)
*H01M 2/10* (2006.01)
(Continued)

(52) U.S. Cl.
CPC ........... *H01M 2/206* (2013.01); *H01M 2/024* (2013.01); *H01M 2/1061* (2013.01);
(Continued)

(58) Field of Classification Search
CPC .............................. H01M 2/206; H01M 2/266
See application file for complete search history.

(56) References Cited

U.S. PATENT DOCUMENTS 8,741,471 B2   6/2014  Park et al.
8,765,289 B2   7/2014  Ikeda et al.
(Continued)

FOREIGN PATENT DOCUMENTS

CN    101662035 A    3/2010
EP    2 672 547 A2   12/2013
(Continued)

OTHER PUBLICATIONS

International Search Report for PCT/KR2015/002212 dated Jun. 19, 2015.

*Primary Examiner* — Maria Laios
(74) *Attorney, Agent, or Firm* — Birch, Stewart, Kolasch & Birch, LLP

(57) ABSTRACT

Disclosed are a battery module and a battery pack including the same, in which laser welding can be used for coupling three or more electrode leads to a single bus bar, thereby enhancing adhesion and improving the ease of a manufacturing process. The battery module includes: a plurality of secondary batteries, each including an electrode assembly, a case and an electrode lead; and a terminal bus bar having a plate-like coupling unit, wherein electrode leads of the same polarity provided in the three or more secondary batteries are coupled to the coupling unit, two or more electrode leads stacked to each other are in contact with one end of the coupling unit, and the other one or more electrode leads are in contact with the other end of the coupling unit.

17 Claims, 8 Drawing Sheets

(51) Int. Cl.
    *H01M 2/02* (2006.01)
    *H01M 2/30* (2006.01)
    *H01M 2/26* (2006.01)
    *B60L 50/64* (2019.01)

(52) U.S. Cl.
    CPC ......... *H01M 2/1077* (2013.01); *H01M 2/204* (2013.01); *H01M 2/26* (2013.01); *H01M 2/305* (2013.01); *B60L 50/64* (2019.02); *H01M 2220/20* (2013.01); *H01M 2220/30* (2013.01)

(56) References Cited

U.S. PATENT DOCUMENTS

| | | | |
|---|---|---|---|
| 2009/0047575 A1 | 2/2009 | Abe et al. | |
| 2010/0224671 A1* | 9/2010 | Scheuerman | B23K 20/10 228/110.1 |
| 2011/0097620 A1* | 4/2011 | Kim | H01M 2/1061 429/161 |
| 2013/0330595 A1* | 12/2013 | Lee | H01M 2/1016 429/159 |
| 2014/0120406 A1 | 5/2014 | Kim | |

FOREIGN PATENT DOCUMENTS

| | | | |
|---|---|---|---|
| JP | 2004-87337 A | 3/2004 | |
| JP | 2012-109275 A | 6/2012 | |
| KR | 10-2009-0017988 A | 2/2009 | |
| KR | 10-2013-0009632 A | 1/2013 | |
| KR | 10-2013-0023033 A | 3/2013 | |
| KR | 10-2013-0113145 A | 10/2013 | |
| WO | WO-2012148100 A2 * | 11/2012 | ......... H01M 2/1016 |

\* cited by examiner

BATTERY MODULE AND BATTERY PACK COMPRISING SAME

TECHNICAL FIELD

The present application claims priority to Korean Patent Application No. 10-2014-0037969 filed on Mar. 31, 2014 and Korean Patent Application No. 10-2015-0031449 filed on Mar. 6, 2015 in the Republic of Korea, the disclosures of which are incorporated herein by reference.

The present disclosure relates to a battery module, and more particularly, to a battery module including three or more secondary batteries connected in parallel, to which a new coupling structure of an electrode lead and a bus bar is applied.

BACKGROUND ART

Recently, the demand for portable electronic products such as notebooks, video cameras, cellular phones or the like has rapidly increased, and electric vehicles, energy storage batteries, robots, satellites have been actively developed. For this reason, high-performance secondary batteries allowing repeated charging and discharging are being actively studied.

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the case.

Recently, secondary batteries are widely used not only for small-sized devices such as cellular phones but also middle-sized or large-sized devices such as vehicles and power storages. In particular, along with the exhaustion of carbon energy and the increased interest on environments, hybrid electric vehicles and electric vehicles attract attention globally, for example in US, Europe, Japan and Korea. In such a hybrid electric vehicle or electric vehicle, a battery pack for giving a driving force to a vehicle motor is the most essential part. Since a hybrid electric vehicle or electric vehicle may obtain a driving force by means of charging and discharging of the battery pack, the hybrid electric vehicle or electric vehicle ensures excellent fuel efficiency and exhausts no or reduced pollutants, and for this reason, hybrid electric vehicles and electric vehicles are used more and more. In addition, the battery pack of the hybrid electric vehicle or electric vehicle includes a plurality of secondary batteries, and the plurality of secondary batteries are connected to each other in series or in parallel to improve capacity and output.

Such parallel or series connection among secondary batteries may be determined in various ways depending on output, capacity, structure or the like of the battery pack in consideration of a device to which the battery pack is applied. Therefore, secondary batteries are connected in series or in parallel in various ways to configure a battery module, and the battery pack may include at least one battery module. In particular, the battery module may be configured so that three or more secondary batteries are connected in parallel, on occasions.

In order to connect three or more secondary batteries in parallel as above, electrode leads of the same polarity should be coupled to each other through a bus bar, and the electrode leads are frequently welded to stably maintain their coupled state.

In order to weld the electrode lead and the bus bar, laser welding is representatively used. Generally, in the laser welding, if a plurality of electrode leads, for example three or more electrode leads, are welded to a bus bar in an overlapped state, the welding reliability may not be ensured. In other words, as the number of electrode leads welded to the bus bar increases, the electrode leads are not welded agreeably to the bus bar, which may result in failure in welding. Also, even though welding is performed, the welded portion may be separated while the battery module is manufactured or used later. In particular, if the electrode lead is not properly welded to the bus bar and its welded portion is separated while the battery module is in use, the battery module may suffer from deteriorated performance or malfunction, and also the separated electrode lead may cause an electric short in the battery module, which may lead to fire or explosion.

Therefore, in an existing technique, when a plurality of secondary batteries, for example three or more secondary batteries, are connected in parallel, ultrasonic welding is frequently used, or a plurality of bus bars are used so that the electrode leads and the bus bars are laser-welded.

However, if such an existing technique is used, since the welding process is limited to the ultrasonic welding, the degree of freedom in designs and processes may be seriously reduced. In addition, the ultrasonic welding may not ensure a sufficient welding strength in comparison to laser welding and may demand more costs due to exchange of consumables such as a horn and an anvil. Moreover, if a plurality of secondary batteries are connected in parallel using a plurality of bus bars, the welding process becomes complicated, and the bus bars occupy a greater space in the battery module, which may increase costs.

DISCLOSURE

Technical Problem

The present disclosure is designed to solve the problems of the related art, and therefore the present disclosure is directed to providing a battery module, in which laser welding can be used for coupling three or more electrode leads to a single bus bar, thereby enhancing adhesion and improving the ease of a manufacturing process, and is also directed to providing a battery pack including the battery module and a vehicle to which the battery module is applied.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a plurality of secondary batteries, each including an electrode assembly, a case and an electrode lead; and a terminal bus bar having a plate-like coupling unit, wherein electrode leads of the same polarity provided in the three or more secondary batteries are coupled to the coupling unit, two or more electrode leads stacked to each other are in contact with one end of the coupling unit, and the other one or more electrode leads are in contact with the other end of the coupling unit.

Preferably, one electrode lead may be in contact with the other end of the coupling unit of the terminal bus bar.

Also preferably, the electrode lead may be partially bent, and an end of the bent portion may be in contact with the terminal bus bar.

Also preferably, the two or more electrode leads and the other one or more electrode leads may be respectively bent in opposite directions at both ends of the coupling unit and are in contact with the terminal bus bar.

Also preferably, the two or more electrode leads and the other one or more electrode leads may be bent in a vertical direction.

Also preferably, the two or more electrode leads and the other one or more electrode leads may be in contact with the same surface of the coupling unit of the terminal bus bar.

Also preferably, the coupling unit of the terminal bus bar may be interposed between ends of the electrode leads and the case and be in contact with the electrode leads.

Also preferably, the two or more electrode leads and the coupling unit of the terminal bus bar may be coupled to each other by means of laser welding, and the one or more electrode leads and the coupling unit of the terminal bus bar may be coupled to each other by means of laser welding.

Also preferably, the battery module according to the present disclosure may further include an inter bus bar connected to the electrode leads of different polarities.

Also preferably, the inter bus bar may include a plate-like first coupling unit, a plate-like second coupling unit and a connecting unit for connecting the first coupling unit and the second coupling unit, three or more electrode leads of different polarities may be coupled to the first coupling unit and the second coupling unit, two or more electrode leads stacked to each other may be in contact with one ends of the first coupling unit and the second coupling unit, and the other one or more electrode leads may be in contact with the other ends of the first coupling unit and the second coupling unit.

Also preferably, the battery module may comprise two or more terminal bus bars.

Also preferably, the battery module according to the present disclosure may further include a support member configured to support the two or more terminal bus bars.

Also preferably, the battery module may comprise two or more support members respectively provided at opposite sides of the secondary battery.

Also preferably, the terminal bus bar may further include a terminal part connected to an electrode terminal of the battery module and bent perpendicular to the coupling unit.

Also preferably, the secondary battery may be a pouch-type secondary battery.

Also preferably, the pouch-type secondary battery may include a positive electrode lead and a negative electrode lead which protrude in opposite directions.

In another aspect of the present disclosure, there is also provided a battery pack, which comprises the battery module according to the present disclosure.

In another aspect of the present disclosure, there is also provided a vehicle, which comprises the battery module according to the present disclosure.

Advantageous Effects

According to an aspect of the present disclosure, in a configuration where three or more electrode leads are coupled to a single bus bar, a welding strength between the bus bar and the electrode leads may be improved by decreasing the number of electrode leads overlapped on the bus bar.

In particular, according to an embodiment of the present disclosure, three or more electrode leads are coupled to a single bus bar in contact, and to the coupled portion, not only ultrasonic welding but also laser welding may be applied.

Therefore, according to this aspect of the present disclosure, in a battery module including three or more secondary batteries connected in parallel like a 3-parallel (3P) configuration, when three or more electrode leads are coupled to a single bus bar, the coupled portion may be fixed by means of laser welding.

Therefore, in this aspect of the present disclosure, when the bus bar and the electrode leads are welded, not only ultrasonic welding but also laser welding may be used, which increases the degree of freedom in designs and processes of the battery module.

Further, since the laser welding ensures a greater welding strength in comparison to ultrasonic welding and does not require any cost for exchanging consumables such as a horn and an anvil, in this aspect of the present disclosure, it is possible to stably ensure a coupling force between the electrode leads and the bus bar and also lower the manufacture costs.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
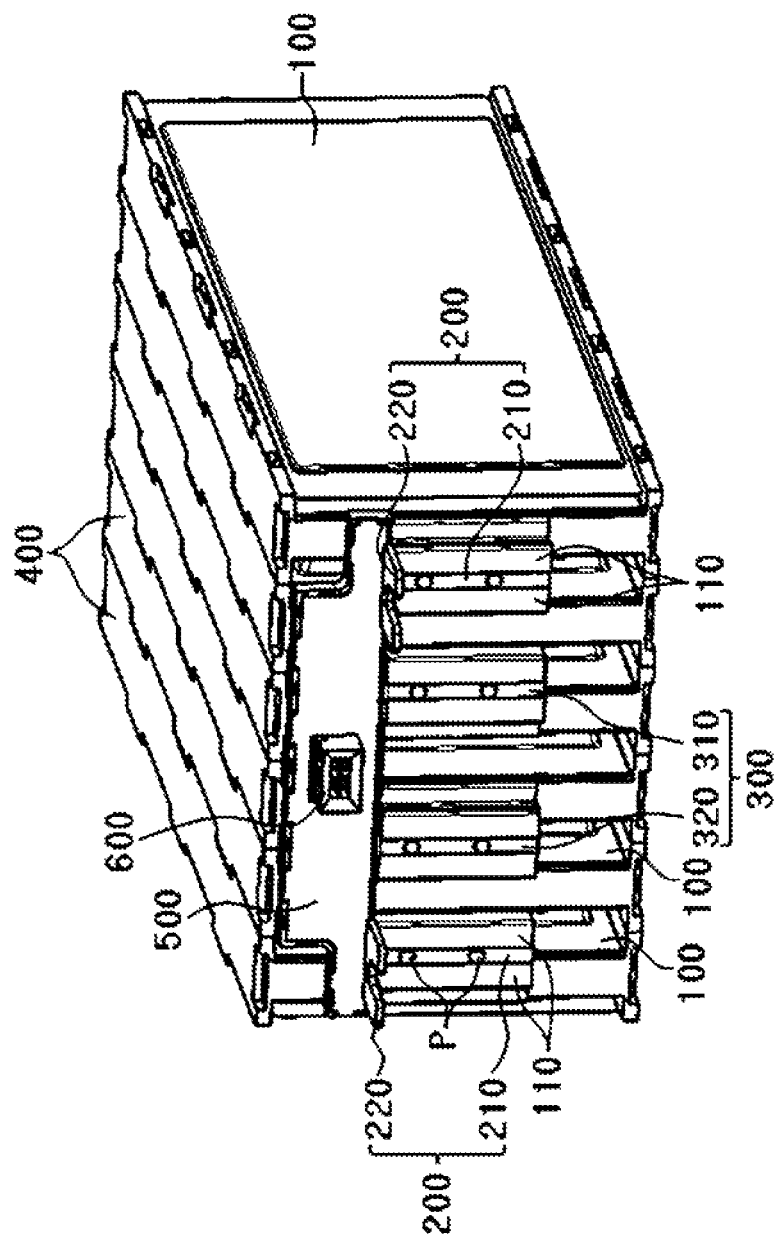
FIG. 1 is an assembled perspective view schematically showing a battery module according to an embodiment of the present disclosure.
Figure 2:
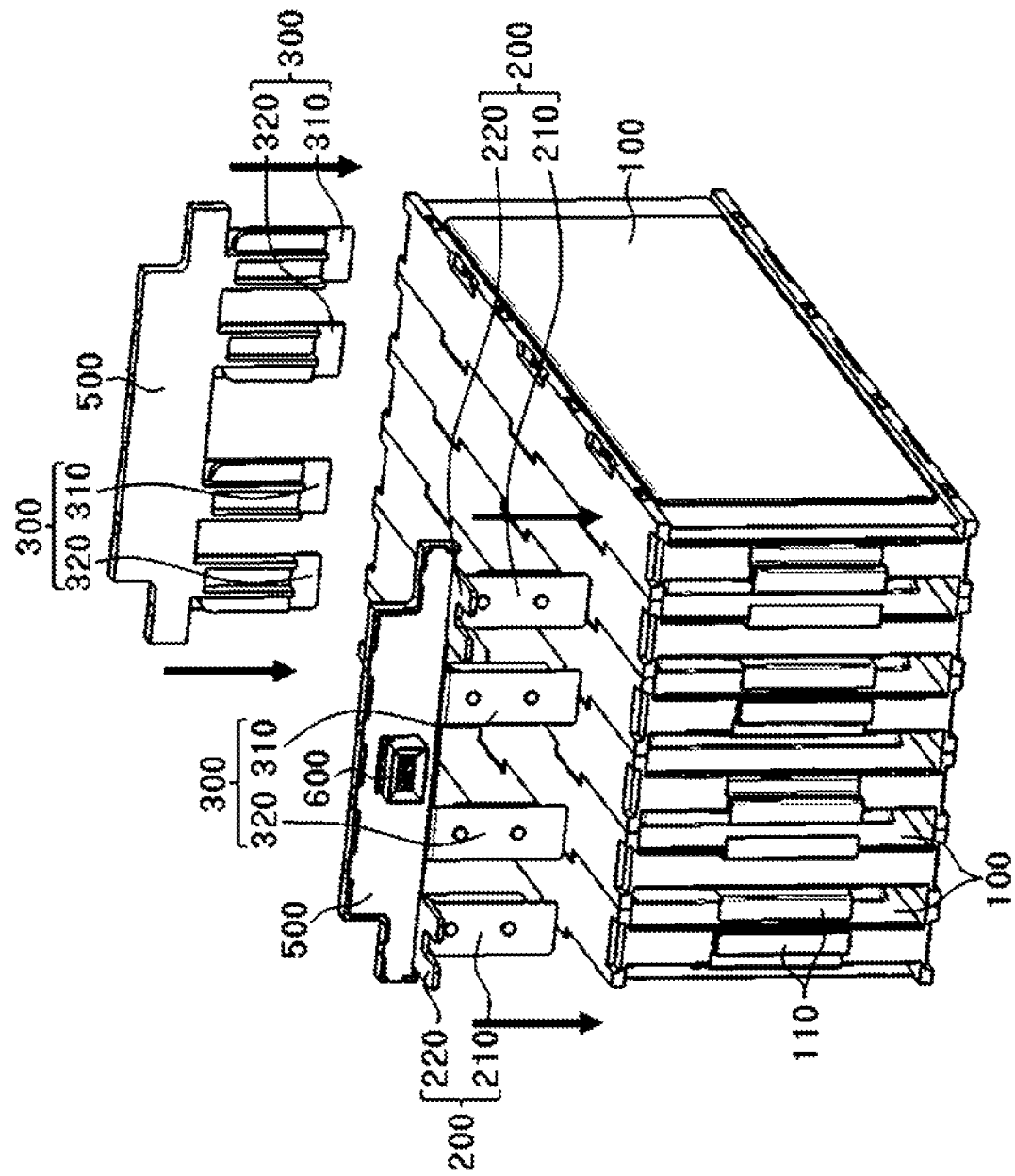
FIG. 2 is an exploded perspective view of some components of FIG. 1.

FIG. 1 is an assembled perspective view schematically showing a battery module according to an embodiment of the present disclosure, and FIG. 2 is an exploded perspective view of some components of FIG. 1.

Referring to FIGS. 1 and 2, the battery module according to the present disclosure includes a plurality of secondary batteries 100 and a terminal bus bar 200.

The secondary battery 100 includes an electrode assembly, a case 120 and an electrode lead 110. In addition, the case 120 of the secondary battery 100 may contain an electrolyte therein. Here, the electrode lead 110 may include a positive electrode lead and a negative electrode lead. Also, the positive electrode lead may be connected to a positive electrode plate of an electrode assembly, and the negative electrode lead may be connected to a negative electrode plate of the electrode assembly.

Preferably, the secondary battery 100 may be a pouch-type secondary battery. In case of the pouch-type secondary battery, the case 120 may be a pouch exterior. The pouch exterior may be configured so that a metal foil made of aluminum or the like is interposed between insulation layers. If the secondary battery 100 is a pouch-type secondary battery as described above, a plurality of secondary batteries 100 may be connected more easily.

Here, the battery module according to the present disclosure may further include a stacking frame 400 for stacking the pouch-type secondary batteries.

Figure 3:
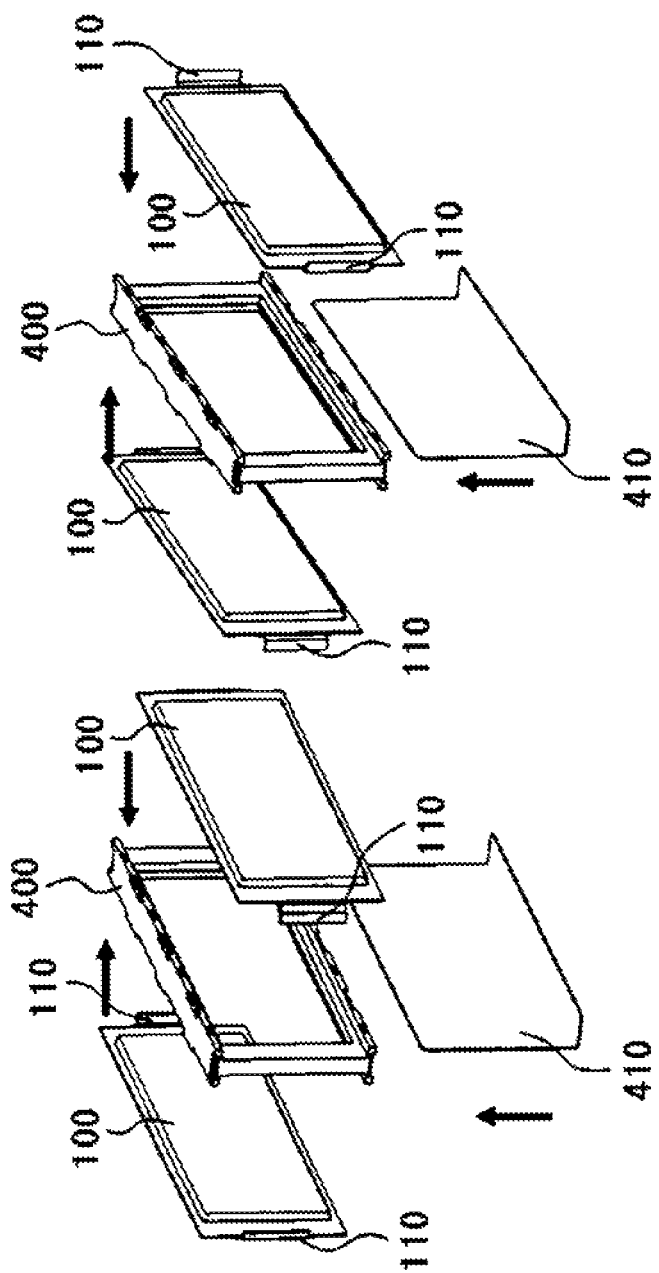
FIG. 3 is an exploded perspective view schematically showing only a part of pouch-type secondary batteries stacked using stacking frames, in the configuration of FIGS. 1 and 2.

FIG. 3 is an exploded perspective view schematically showing only a part of pouch-type secondary batteries 100 stacked using the stacking frame 400, in the configuration of FIGS. 1 and 2. In FIG. 3, only four pouch-type secondary batteries 100 and two stacking frames 400 are depicted for convenience.

Referring to FIG. 3, the stacking frame 400 is a component used for stacking the pouch-type secondary batteries 100, and the stacking frame 400 is configured to hold the secondary battery 100 and prevent the secondary battery 100 from moving. The stacking frames 400 are configured to be stacked to each other and thus guide the secondary batteries 100 to be assembled.

The stacking frame 400 may also be called using various other terms such as cartridge and may have a rectangular ring shape with a hollow center. At this time, four edges of the stacking frame 400 may be located at the outer circumference of the secondary battery 100. In addition, the secondary batteries 100 may be respectively located at both sides of the stacking frame 400.

In addition, the battery module according to the present disclosure may further include a cooling fin 410. The cooling fin 410 may be made of thermally conductive material such as aluminum to exchange heat with the secondary battery 100. In addition, the cooling fin 410 may be configured to be inserted into the center of the stacking frame 400. Therefore, if the secondary batteries 100 are stacked using the stacking frame 400, the cooling fin 410 may be interposed between the secondary batteries 100. Meanwhile, the cooling fin 410 may be coupled to the stacking frame 400 by means of insert molding.

Preferably, in the pouch-type secondary battery 100, two electrode leads 110, namely the positive electrode lead and the negative electrode lead, may be provided to protrude in opposite directions, as shown in FIGS. 1 to 3. In other words, the pouch-type secondary battery 100 may be configured to have a rectangular shape with four sides, when being observed in a horizontal direction on the basis of FIG. 3, and at this time, the positive electrode lead and the negative electrode lead may be provided to protrude at sides located opposite to each other. For example, as shown in FIG. 3, in a single pouch-type secondary battery 100, at least one of the positive electrode lead and the negative electrode lead may protrude forwards, and the other may protrude rearwards.

In this embodiment of the present disclosure, based on a single secondary battery 100, the positive electrode lead and the negative electrode lead are unlikely to contact each other, and thus each electrode lead 110 may have a sufficiently great size. In addition, in this case, the electrode lead 110 and the terminal bus bar 200 may contact through a greater area, and thus the electrode lead 110 and the terminal bus bar 200 may be coupled more easily. Moreover, at a contact portion between the electrode lead 110 and the terminal bus bar 200, heat emission may be reduced.

However, the present disclosure is not limited to the above embodiment, and the positive electrode lead and the negative electrode lead may also be located at the same side or at adjacent sides.

The terminal bus bar 200 includes a plate-like coupling unit 210, and the electrode lead 110 is coupled to a flat surface of the coupling unit 210. In particular, in the present disclosure, three or more electrode leads 110 may be coupled to the coupling unit 210 of the terminal bus bar 200. The coupling configuration of the coupling unit 210 of the terminal bus bar 200 and the electrode leads 110 will be described later in more detail with reference to FIGS. 4 and 5.

Figure 4:
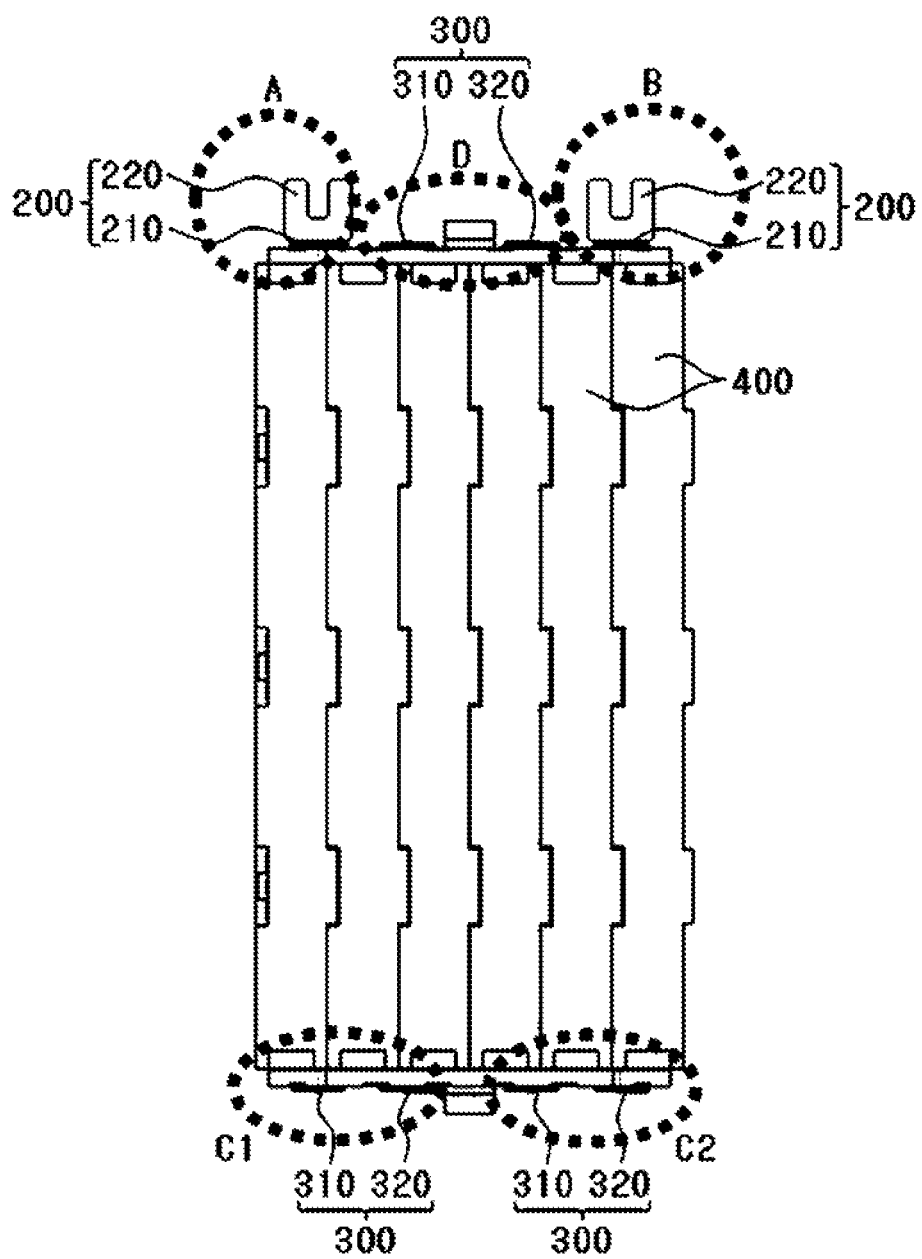
FIG. 4 is a top view showing the configuration of FIG. 1.
Figure 5:
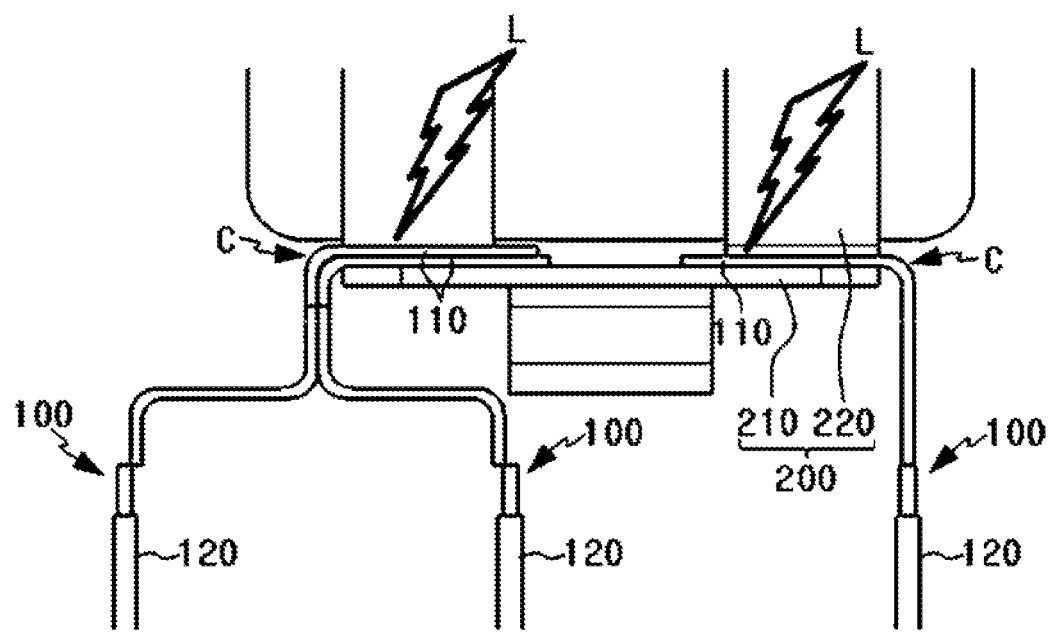
FIG. 5 is an enlarged view showing a portion A of FIG. 4.

FIG. 4 is a top view showing the configuration of FIG. 1, and FIG. 5 is an enlarged view showing a portion A of FIG. 4.

Referring to FIG. 4, six stacking frames 400 are stacked in a lateral direction, and each stacking frame 400 may accommodate two secondary batteries 100. In addition, a coupling structure of the terminal bus bar 200 and the electrode lead 110 at a left top portion of the configuration of FIG. 4 is as shown in FIG. 5.

Referring to FIG. 5, the terminal bus bar 200 is formed with a plate shape and includes a coupling unit 210 having broad surfaces at both sides thereof. In addition, in FIG. 5, the broad surfaces of the coupling unit 210 are disposed toward upper and lower directions. The electrode lead 110 provided at the secondary battery 100 has a plate shape with broad surfaces at both sides thereof, one of which may be coupled to the coupling unit 210 in contact while facing a broad surface of the coupling unit 210. In particular, as shown in FIG. 5, three electrode leads 110 may be coupled to the coupling unit 210 of a single terminal bus bar 200. At this time, three electrode leads 110 are respectively provided at three secondary batteries 100 different from each other and may have the same polarity. For example, three electrode leads 110 connected to a single terminal bus bar 200 as shown in FIG. 5 may be entirely positive electrode leads. In this case, three secondary batteries 100 may be connected to each other in parallel.

If three or more electrode leads 110 are coupled to the coupling unit 210 of a single terminal bus bar 200 as described above, two or more electrode leads 110 of three or more electrode lead 110 may be in contact with one end of the coupling unit 210 in a stacked state, and the other one or more electrode leads 110 may be in contact with the other end of the coupling unit 210.

In other words, if three electrode leads 110 are coupled to a single terminal bus bar 200 as shown in FIG. 5, two bus bars are in contact with a left end of the coupling unit 210 of the terminal bus bar 200 in a state where the bus bars are overlapped at least partially, particularly at their ends, and the other single electrode lead 110 may be at least partially, particularly at its end, in contact with a right end of the coupling unit 210 of the terminal bus bar 200.

In addition, the coupled portion of the electrode lead 110 and the terminal bus bar 200 may be fixed to each other by performing a welding process, as indicated by L in FIG. 5.

In particular, in the configuration of the present disclosure as shown in FIG. 5, one or two electrode leads 110 are overlapped with respect to the coupling unit 210 of a single terminal bus bar 200. Therefore, as indicated by L, laser welding may be performed to the contact portion of the electrode lead 110 and the terminal bus bar 200 to fix them to each other. In case of laser welding, three or more electrode leads 110 may not be easily welded to the bus bar in an overlapped state. However, in the configuration of the present disclosure, even though three or more electrode leads 110 are coupled to a single terminal bus bar 200, the maximum number of electrode leads 110 overlapped with each other is just two, and thus they may be coupled by means of laser welding.

Therefore, in the present disclosure, when the electrode lead 110 and the terminal bus bar 200 are coupled, laser welding may be adopted. The laser welding may ensure excellent welding reliability since its welding strength is more excellent in comparison to other welding methods such as ultrasonic welding, and the costs for exchanging consumables such as a horn or an anvil used in ultrasonic welding may be reduced. Moreover, since laser welding may be used together with other welding methods such as ultrasonic welding, various welding methods may be used, which may increase the degree of freedom in designs and fabricating processes for a battery module and a battery pack.

Preferably, the electrode lead 110 is partially bent to form a bent portion, and an end of the bent portion may be in contact with the terminal bus bar 200.

For example, in the configuration of FIG. 5, three electrode leads 110 are respectively bent at portions indicated by C, and the ends of such bent portions may be coupled in contact with the coupling unit 210 of the terminal bus bar 200.

More preferably, a plurality of electrode leads 110 in contact with the coupling unit 210 of the terminal bus bar 200 may be bent in opposite directions at both side ends of the coupling unit 210 and in contact with the terminal bus bar 200.

For example, if three electrode leads 110 are in contact with the coupling unit 210 of the terminal bus bar 200 as shown in FIG. 5, two left electrode leads 110 may be bent in a right direction to be in contact with a left end of the coupling unit 210 of the terminal bus bar 200, and one right electrode lead 110 may be bent in a left direction to be in contact with a right end of the coupling unit 210 of the terminal bus bar 200.

Also preferably, the plurality of electrode leads 110 may be bent vertically, and the bent ends are in contact with the coupling unit 210 of the terminal bus bar 200.

For example, if three electrode leads 110 are in contact with the coupling unit 210 of the terminal bus bar 200 as shown in FIG. 5, two left electrode leads 110 may be bent 90 degrees (°) in a right direction and in contact with the coupling unit 210 of the terminal bus bar 200, and one right electrode lead 110 may be bent 90 degrees in a left direction and in contact with the coupling unit 210 of the terminal bus bar 200.

In this configuration of the present disclosure, even though the plurality of electrode leads 110 are in contact with any portion of the coupling unit 210 of the terminal bus bar 200, the electrode leads 110 may be easily coupled to the coupling unit 210 of the terminal bus bar 200, which has a shape of a flat plate. For example, in the configuration of FIG. 5, when the electrode lead 110 is bent 90 degrees, the electrode lead 110 may be stably in contact with the flat surface of the coupling unit 210 of the terminal bus bar 200, even though the electrode lead 110 is in contact with any of a left end and a right end of the coupling unit 210 of the terminal bus bar 200.

Meanwhile, in the embodiment of FIG. 5, two electrode leads 110 are bent in an overlapped state and their bent ends are in contact with the left end of the coupling unit 210 of the terminal bus bar 200, and one electrode lead 110 is bent solely and its bent end is in contact with the right end of the coupling unit 210 of the terminal bus bar 200. However, the present disclosure is not limited to this embodiment. For example, it is also possible that one electrode lead 110 is bent and its bent end is in contact with the left end of the coupling unit 210 of the terminal bus bar 200, and also two electrode leads 110 are bent in an overlapped state and their bent ends are in contact with the right end of the coupling unit 210 of the terminal bus bar 200.

Also preferably, three or more electrode leads 110 coupled to a single terminal bus bar 200 may be in contact with the same surface of the coupling unit 210 of the terminal bus bar 200.

In other words, the coupling unit 210 of the terminal bus bar 200 may have a plate shape with broad surfaces at upper and lower portions thereof, and here, two left electrode leads 110 and one right electrode lead 110 may be entirely in contact with an outer surface or an inner surface of the coupling unit 210 of the terminal bus bar 200. Here, the outer surface means a surface of the coupling unit 210 of the terminal bus bar 200, which is opposite to a side where the case 120 of the secondary battery 100 is located, and the inner surface means a surface at a side where the case 120 of the secondary battery 100 is located.

In this configuration of the present disclosure, since all electrode leads 110 are in contact with any one surface of the coupling unit 210 of the terminal bus bar 200, the coupling unit 210 of the terminal bus bar 200 and the electrode leads 110 may be contacted and welded more easily.

In particular, as shown in FIG. 5, all of two left electrode leads 110 and one right electrode lead 110 may be in contact with an upper surface, namely an outer surface, of the coupling unit 210 of the terminal bus bar 200.

In this case, the coupling unit 210 of the terminal bus bar 200 may be interposed between an end of the electrode lead 110 and the case 120 of the secondary battery 100 and in contact with the electrode lead 110. In other words, in the configuration of FIG. 5, the coupling unit 210 of the terminal bus bar 200 may be coupled in contact with the inner surface of the electrode lead 110.

In this configuration of the present disclosure, since the bent end of the electrode lead 110 is present at an outer side of the coupling unit 210 of the terminal bus bar 200, the coupling unit 210 of the terminal bus bar 200 is not easily separated from the electrode lead 110, but its coupling state to the electrode lead 110 may be more firmly maintained. In other words, in the configuration of FIG. 5, since the bent end of the electrode lead 110 is located at the upper surface of the coupling unit 210 of the terminal bus bar 200, the terminal bus bar 200 may be held not to move upwards.

In this regard, based on the configuration of FIGS. 1 and 2, since the terminal bus bar 200 is interposed between the bent end of the electrode lead 110 and the body of the secondary battery 100, the terminal bus bar 200 located at a front side of the battery module may not be easily separated forwards.

Meanwhile, if the terminal bus bar 200 is interposed between the end of the electrode lead 110 and the case 120 as described above, in a state where the electrode lead 110 is bent, the terminal bus bar 200 may be prepared to be slid into the space between the bent end of the electrode lead 110 and the case 120, in a lower direction as indicated by an arrow in FIG. 2.

Also preferably, the coupling unit 210 of the terminal bus bar 200 may have a protrusion protruding outwards at an outer surface thereof. In addition, the protrusion may be interposed between the bent ends of the electrode leads 110 coupled to outer surfaces of the corresponding terminal bus bar 200.

In other words, as indicated by P in FIGS. 1 and 2, the protrusion may be provided to protrude forwards at a front surface, namely an outer surface, of the coupling unit 210 of the terminal bus bar 200. At this time, one or two electrode leads 110 may be respectively in contact with a left end and a right end of the coupling unit 210 of the terminal bus bar 200 in a bent state. In this case, the protrusion formed at the coupling unit 210 of the terminal bus bar 200 may be located between the bent ends of such one or two electrode leads 110. In other words, in the configuration of FIGS. 1 and 2, the protrusion of the terminal bus bar 200 may be located at a right side of the end of the electrode lead 110 bent at the left end of the terminal bus bar 200 and in contact therewith and a left side of the end of the electrode lead 110 bent at the right end of the terminal bus bar 200 and in contact therewith.

In this configuration of the present disclosure, the protrusion of the terminal bus bar 200 may serve as a guide when the terminal bus bar 200 and the electrode leads 110 are inserted. For example, if a bus bar is inserted between the bent ends of the electrode leads 110 and the case 120 of the secondary battery 100 as indicated by the arrow in FIG. 2, the terminal bus bar 200 may be inserted in a state where the protrusion of the terminal bus bar 200 is located between the bent ends of the electrode leads 110. Therefore, in this configuration of the present disclosure, when the terminal bus bar 200 is inserted or moved, the terminal bus bar 200 may be positioned more easily. Moreover, the protrusion may play a role of holding the terminal bus bar 200 not to move in a lateral direction in a state of being coupled to the electrode lead 110, and thus the coupling force between the terminal bus bar 200 and the electrode lead 110 may be reinforced.

Also preferably, two or more terminal bus bars 200 may be provided. In particular, a terminal bus bar 200 coupled to three or more positive electrode leads and a terminal bus bar 200 coupled to three or more negative electrode leads may be separately included.

Figure 6:
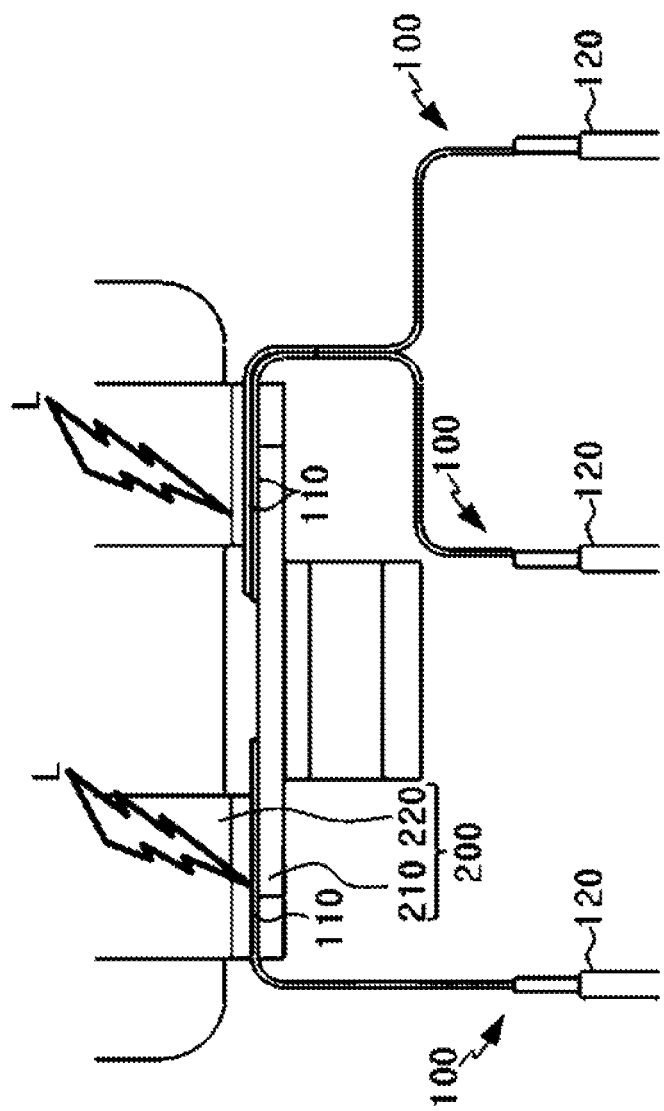
FIG. 6 is an enlarged view showing a portion B of FIG. 4.

FIG. 6 is an enlarged view showing a portion B of FIG. 4.

Referring to FIG. 6, three electrode leads 110 are coupled to the coupling unit 210 of the terminal bus bar 200. At this time, since the battery module depicted in FIG. 4 includes twelve secondary batteries 100 in total, if three electrode leads 110 located at the portion A are positive electrode leads, three electrode leads 110 located at the portion B may be negative electrode leads.

In more detail, in the configuration of FIG. 6, among three electrode leads 110 provided at different secondary batteries 100, one left electrode lead 110 may be in contact with the left end of the terminal bus bar 200, and the other two right electrode leads 110 may be in contact with the right end of the coupling unit 210 of the terminal bus bar 200.

At this time, one left electrode lead 110 may be bent 90 degrees in a right direction and the bent end may be in contact with the left end of the coupling unit 210 of the terminal bus bar 200, and two right electrode leads 110 may be bent 90 degrees in a left direction and the bent end may be in contact with the right end of the coupling unit 210 of the terminal bus bar 200.

In addition, in the configuration of FIG. 6, one electrode lead 110 in contact with the left end of the coupling unit 210 of the terminal bus bar 200 and two electrode leads 110 in contact with the right end of the coupling unit 210 of the terminal bus bar 200 may be in contact with the same surface of the coupling unit 210 of the terminal bus bar 200, similar to the configuration of FIG. 5. In particular, all of one left electrode lead 110 and two right electrode leads 110 may be in contact with the upper surface, namely the outer surface, of the coupling unit 210 of the terminal bus bar 200, and in this case, the coupling unit 210 of the terminal bus bar 200 may be interposed between the end of the electrode lead 110 and the case 120.

Preferably, the terminal bus bar 200 may further include a terminal part 220. Here, the terminal part 220 may be a portion of the terminal bus bar 200, which is directly or indirectly connected to an electrode terminal of the battery module. In particular, the terminal part 220 may have a plate shape and be bent perpendicular to the coupling unit 210 to which the electrode leads 110 are coupled.

For example, in the configuration of FIGS. 1 and 2, the coupling unit 210 of the terminal bus bar 200 is configured to erect vertically, and the terminal part 220 may be configured to lie down in a front and rear direction, namely in a horizontal direction, to be perpendicular to the coupling unit 210.

At this time, the electrode terminal, namely a positive electrode terminal or a negative electrode terminal, may be configured to have a bolt shape which erects vertically, and for easier coupling to such an electrode terminal, a concave groove may be formed at one side of the terminal part 220 so that the electrode terminal is inserted therein. For example, in the configuration of FIGS. 1 and 2, a U-shaped groove may be formed at a front end of the terminal part 220, and the electrode terminal may be inserted into the groove to be in contact with the terminal part 220.

Also preferably, the battery module according to the present disclosure may further include an inter bus bar 300. The inter bus bar 300 may be connected to electrode leads 110 of different polarities, and particularly, all of three or more positive electrode leads and three or more negative electrode leads may be in contact with one inter bus bar 300. A coupling configuration of the inter bus bar 300 and the electrode leads 110 will be described later in more detail with reference to FIGS. 7 and 8.

Figure 7:
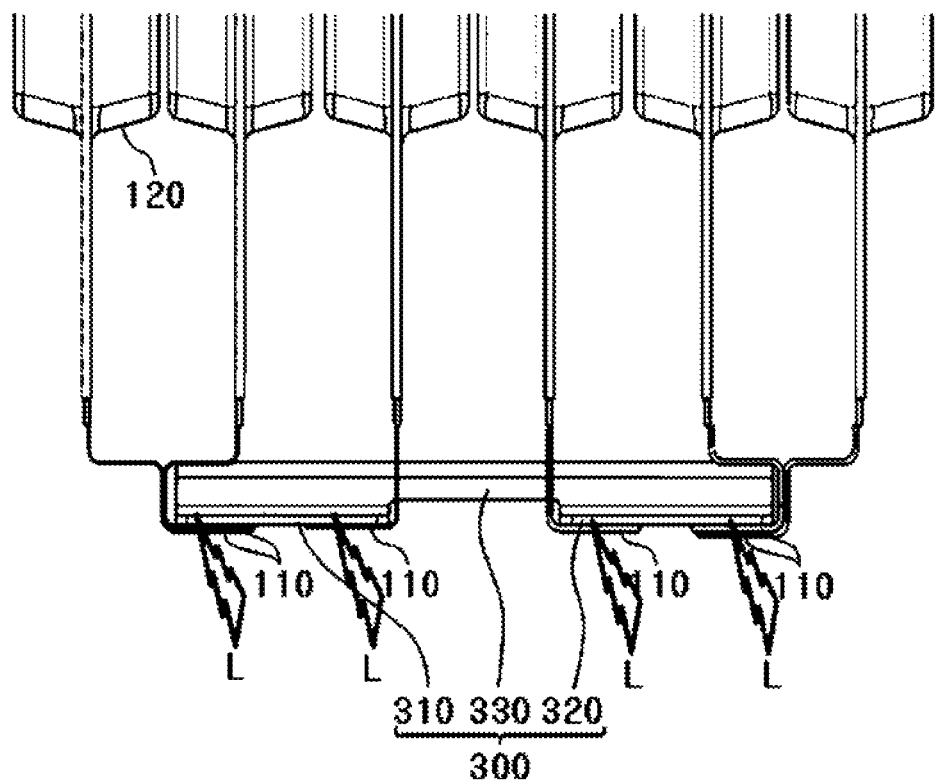
FIG. 7 is an enlarged view showing portions C1 and C2 of FIG. 4.
Figure 8:
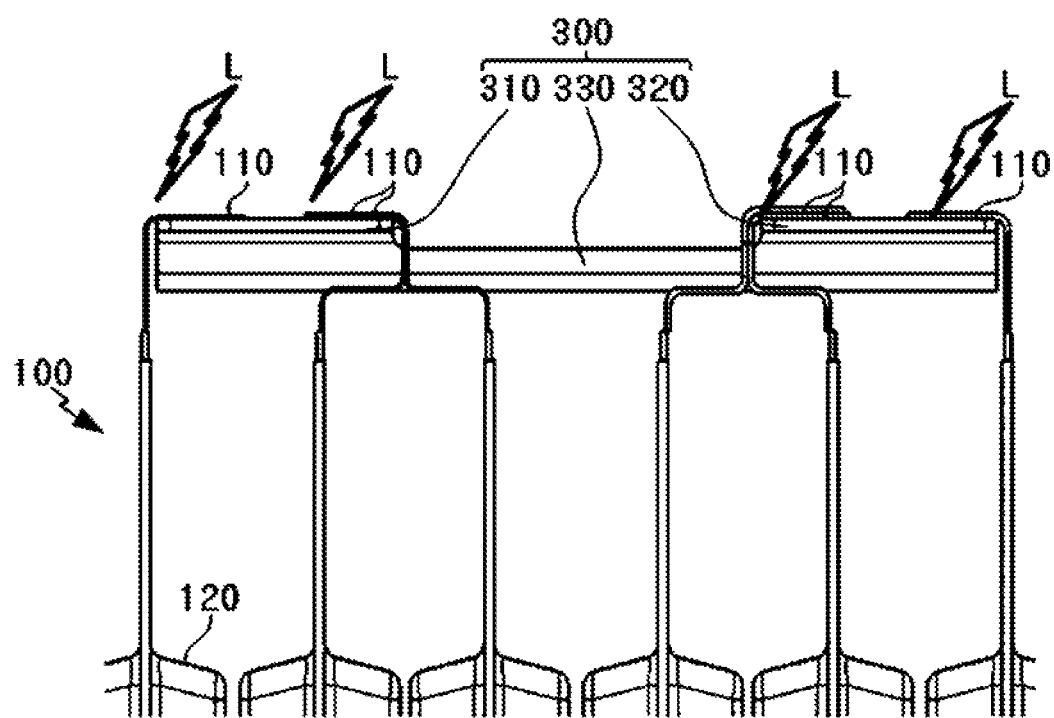
FIG. 8 is an enlarged view showing a portion D of FIG. 4.

FIG. 7 is an enlarged view showing portions C1 and C2 of FIG. 4, and FIG. 8 is an enlarged view showing a portion D of FIG. 4.

Referring to FIGS. 7 and 8, the inter bus bar 300 may include a first coupling unit 310, a second coupling unit 320 and a connecting unit 330. In addition, the inter bus bar 300 may be coupled to six or more electrode leads 110.

Here, the first coupling unit 310 and the second coupling unit 320 have a plate shape with a broad surface, and three or more electrode leads 110 may be respectively coupled thereto. For example, if six electrode leads 110 are coupled to the inter bus bar 300 as show in FIGS. 7 and 8, three electrode leads 110 located at a left side may be coupled to the first coupling unit 310, and three electrode leads 110 located at a right side may be coupled to the second coupling unit 320.

At this time, the electrode leads 110 coupled to the first coupling unit 310 and the electrode leads 110 coupled to the second coupling unit 320 may have different polarities.

For example, if the configuration depicted in FIG. 7 is applied to the portion C1 of FIG. 4, three left secondary batteries 100 may be identical to three secondary batteries 100 depicted in FIG. 5. Therefore, if three electrode leads 110 depicted in FIG. 5 are entirely positive electrode leads, three electrode leads 110 coupled to the first coupling unit 310 located at a left side of the inter bus bar 300 depicted in FIG. 7 may be entirely negative electrode leads. In addition, three electrode leads 110 coupled to the second coupling unit 320 located at a right side of the inter bus bar 300 of FIG. 7 may be entirely positive electrode leads.

Here, two electrode leads 110 in a stacked state are respectively in contact with one ends of the first coupling unit 310 and the second coupling unit 320 of the inter bus bar 300, and one or two electrode leads 110 may be in contact with the other end thereof. However, FIGS. 7 and 8 depict the configuration where one electrode lead 110 is in contact with the other end of the inter bus bar 300.

In more detail, in the configuration of FIG. 7, if three left electrode leads 110 are coupled to the first coupling unit 310 of the inter bus bar 300, among them, two electrode leads 110 may be bent vertically at a right side in a stacked state to be in contact with a left end of the first coupling unit 310, and the other one electrode lead 110 may be bent vertically at a left side to be in contact with a right end of the first coupling unit 310.

In addition, in the configuration of FIG. 7, if three right electrode leads 110 are coupled to the second coupling unit 320 of the inter bus bar 300, among them, one electrode lead 110 may be bent vertically at a right side to be in contact with a left end of the second coupling unit 320, and the other two electrode leads 110 may be bent vertically at a left side in a stacked state to be in contact with a right end of the second coupling unit 320.

Meanwhile, the connecting unit 330 connects the first coupling unit 310 and the second coupling unit 320 to each other. Therefore, the electrode lead 110 coupled to the first coupling unit 310 and the electrode lead 110 coupled to the second coupling unit 320 may be electrically connected to each other. Therefore, among six secondary batteries 100 depicted in FIG. 7, if negative electrode leads of three left secondary batteries 100 are coupled to the first coupling unit 310 and positive electrode leads of the other three right secondary battery 100 are coupled to the second coupling unit 320, three left secondary batteries 100 may be connected to each other in parallel and three right secondary batteries 100 may be connected to each other in parallel, respectively, and also three left secondary batteries 100 and three right secondary batteries 100 respectively connected in parallel may be connected to each other in series.

In the configuration of FIG. 8, if the configuration depicted in FIG. 7 is applied to the portion C1 of FIG. 4, among six secondary batteries 100 depicted in FIG. 8, three left secondary batteries may be identical to three right secondary batteries depicted in FIG. 7. Therefore, if three right electrode leads 110 depicted in FIG. 7 are positive electrode leads, three left electrode leads 110 depicted in FIG. 8 may be negative electrode leads.

In addition, three left electrode leads 110 may be coupled to the first coupling unit 310 of the inter bus bar 300 depicted in FIG. 8. At this time, among three left electrode leads 110, one electrode lead 110 located at a leftmost side may be bent in a right direction and be in contact with a left end of the first coupling unit 310, and the other two electrode leads 110 may be bent in a left direction in an overlapped state and be in contact with a right end of the first coupling unit 310.

In this configuration of FIG. 8, three right electrode leads 110 may be positive electrode leads. In addition, three right electrode leads 110 may be coupled to the second coupling unit 320 of the inter bus bar 300 depicted in FIG. 8. At this time, among three right electrode leads 110, two left electrode leads 110 may be bent in a right direction in a stacked state and be in contact with a left end of the second coupling unit 320, and the other one right electrode lead 110 may be bent in a left direction and be in contact with a right end of the second coupling unit 320.

In this configuration of FIG. 8, the first coupling unit 310 and the second coupling unit 320 may also be connected to each other by means of the connecting unit 330. Therefore, in the configuration of FIG. 8, three left secondary batteries 100 may be connected to each other in parallel, three right secondary batteries 100 may be connected to each other in parallel, and three left secondary batteries 100 and three right secondary batteries 100 respectively connected in parallel may be connected to each other in series to configure 3-parallel 2-series (3P-2S) connection.

Meanwhile, the configuration of FIG. 7 may also be applied to the portion C2 of FIG. 4. In this case, three left secondary batteries 100 of FIG. 7 may be identical to three right secondary batteries 100 of FIG. 8. Therefore, if three right electrode leads 110 depicted in FIG. 8 are positive electrode leads, three left electrode leads 110 depicted in FIG. 7 may be negative electrode leads. In addition, among three left negative electrode leads, two negative electrode leads may be bent in a right direction in a stacked state and be in contact with the left end of the first coupling unit 310, and the other one negative electrode lead may be bent in a left direction and be in contact with the right end of the first coupling unit 310.

In addition, three right electrode leads 110 depicted in FIG. 7 may be positive electrode leads, and among them, one positive electrode lead may be bent in a right direction and be in contact with the left end of the second coupling unit 320, and the other two positive electrode leads may be bent in a left direction in a stacked state and be in contact with the right end of the second coupling unit 320.

Preferably, the battery module according to the present disclosure may further include a support member 500.

The support member 500 may support two or more terminal bus bars 200. In addition, if the battery module includes one or more inter bus bars 300, the support member 500 may support the inter bus bars 300. In particular, the terminal bus bar 200 and/or the inter bus bar 300 may be at least partially coupled and fixed to the support member 500.

In this configuration of the present disclosure, since locations of the terminal bus bar 200 and the inter bus bar 300 and a distance between them are fixed in advance, the terminal bus bar 200 and the inter bus bar 300 may be coupled to the electrode lead 110 of the secondary battery 100 more easily.

For example, in the configuration of FIG. 2, since the locations of the terminal bus bar 200 and the inter bus bar 300 are fixed by means of the support member 500, if the support member 500 is moved in an arrow direction according to an assembled location of any one of the terminal bus bar 200 and the inter bus bar 300, all of the terminal bus bars 200 and the inter bus bars 300 provided at the corresponding support member 500 may be matched accordingly.

Meanwhile, since a single secondary battery 100 may include at least two electrode leads 110 including a positive electrode lead and a negative electrode lead, at least two support members 500 may be included in the battery module. Here, if the electrode leads 110 of the secondary batteries 100 protrude in opposite directions, two support members 500 may be provided at a side opposite to the secondary batteries 100. For example, the positive electrode lead and the negative electrode lead of each secondary battery 100 may be provided at a front end and a rear end respectively as shown in FIG. 2, and in this case one support member 500 may be located at the front end of the secondary battery 100, and the other one support member 500 may be located at the rear end of the secondary battery 100.

In this configuration of the present disclosure, since a plurality of support members 500 do not interfere each other, an assembling process may be easily performed, and any accident such as an internal electric short caused by electric connection may not easily happen.

Meanwhile, different from the configuration of FIGS. 1 and 2, the electrode leads 110 of the secondary battery 100 may be located at the same side. In this case, some terminal bus bars 200 and inter bus bars 300 may be inserted downwards, and the other terminal bus bars 200 and the other inter bus bars 300 may be inserted upwards. At this time, if two support members 500 supporting the terminal bus bars 200 or the inter bus bars 300 are included in the battery module, two support members 500 may be located at a front end of the secondary battery 100 including the electrode leads 110. In addition, among them, one support member 500 may move downwards so that an outer surface of the terminal bus bar 200 or the inter bus bar 300 supported by one support member 500 is in contact with the electrode lead 110, and the other one support member 500 may move upwards so that an outer surface of the terminal bus bar 200 or the inter bus bar 300 supported by the other one support member 500 is in contact with the electrode lead 110.

In addition, even though it is depicted in the embodiment of FIGS. 5 to 8 that all of three electrode leads 110 are in contact with one surface of the coupling unit 210 of the bus bar, three electrode leads 110 may also be in contact with different surfaces of the coupling unit 210. For example, in the configuration of FIG. 5, among three electrode leads 110, one left electrode lead 110 and one right electrode lead 110 may be in contact with the outer surface, namely the upper surface, of the coupling unit 210, and one middle electrode lead 110 may be in contact with the inner surface, namely the lower surface, of the coupling unit 210. In this configuration of the present disclosure, the outward movement of the coupling unit 210 may be restricted by one left electrode lead 110 and one right electrode lead 110, and the inward movement of the coupling unit 210 may be restricted by one middle electrode lead 110. Therefore, in this configuration of the present disclosure, it is possible to prevent the terminal bus bar 200 or the inter bus bar 300 from moving inwards or outwards.

In addition, the battery module according to the present disclosure may include a connector 600.

The connector 600 may serve as a terminal which is connected to a control device included in a battery pack, for example a battery management system (BMS). In particular, as shown in FIGS. 1 and 2, the connector 600 may be provided at the support member 500 which supports the terminal bus bar 200 and the inter bus bar 300.

The battery pack according to the present disclosure includes at least one battery module as described above. At this time, in addition to the battery module, the battery pack may further include a case 120 for covering the battery module, and various devices for controlling charging/discharging of the battery module, for example BMS, a current sensor, a fuse or the like.

The battery module according to the present disclosure may be applied to a vehicle such as an electric vehicle and a hybrid vehicle. In other words, the vehicle according to the present disclosure may include the battery module according to the present disclosure.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or a shape in which an object is placed.

What is claimed is:

1. A battery module, comprising:
   a plurality of secondary batteries stacked to each other, each including an electrode assembly, a case and electrode leads; and
   a terminal bus bar having a plate-like coupling unit, wherein electrode leads of the same polarity provided in three or more secondary batteries of the plurality of secondary batteries stacked to each other are coupled to the plate-like coupling unit,
   wherein two or more electrode leads of the same polarity are stacked to each other and are in contact with one end of the plate-like coupling unit,
   wherein each of the other one or more of said electrode leads of the same polarity is in direct contact with the other end of the plate-like coupling unit,
   wherein each of said electrode leads of the same polarity is partially bent to form a bent portion, and an end of the bent portion is in contact with the terminal bus bar such that the terminal bus bar is located between the bent portion and the corresponding case, and
   wherein the plate-like coupling unit of the terminal bus bar has a protrusion protruding outwards on an outer surface thereof, and the protrusion is interposed between the two or more electrode leads of the same polarity and the other one or more electrode leads of the same polarity such that the two or more electrode leads of the same polarity and the other one or more electrode leads of the same polarity are connected to flat portions of the outer surface of the plate-like coupling unit adjacent to the protrusion.

2. The battery module according to claim 1, wherein the one or more electrode leads of the same polarity is only one electrode lead.

3. The battery module according to claim 1, wherein the two or more electrode leads of the same polarity and the other one or more electrode leads of the same polarity are respectively bent in opposite directions at both ends of the plate-like coupling unit and are in contact with the terminal bus bar.

4. The battery module according to claim 1, wherein the two or more electrode leads of the same polarity and the other one or more electrode leads of the same polarity are bent in a vertical direction.

5. The battery module according to claim 1, wherein the two or more electrode leads of the same polarity and the other one or more electrode leads of the same polarity are in contact with the same surface of the plate-like coupling unit of the terminal bus bar.

6. The battery module according to claim 1, wherein the plate-like coupling unit of the terminal bus bar is interposed between ends of the electrode leads of the same polarity and the case and is in contact with the electrode leads of the same polarity.

7. The battery module according to claim 1, wherein the two or more electrode leads of the same polarity and the plate-like coupling unit of the terminal bus bar are coupled to each other by means of laser welding, and the one or more electrode leads of the same polarity and the plate-like coupling unit of the terminal bus bar are coupled to each other by means of laser welding.

8. The battery module according to claim 1, further comprising:
an inter bus bar connected to electrode leads having different polarities.

9. The battery module according to claim 8, wherein the inter bus bar includes a plate-like first coupling unit, a plate-like second coupling unit and a connecting unit for connecting the plate-like first coupling unit and the plate-like second coupling unit, wherein three or more electrode leads having different polarities from the electrode leads of the same polarity provided in the three or more secondary batteries are coupled to the plate-like first coupling unit and the plate-like second coupling unit,
wherein two or more electrode leads having the different polarities provided in the three or more secondary batteries stacked to each other are in contact with one ends of the plate-like first coupling unit and the plate-like second coupling unit, and
wherein each of the other one or more electrode leads having the different polarities provided in the three or more secondary batteries is in direct contact with the other ends of the plate-like first coupling unit and the plate-like second coupling unit.

10. The battery module according to claim 1, wherein the battery module comprises two or more terminal bus bars.

11. The battery module according to claim 10, further comprising:
a support member configured to support the two or more terminal bus bars.

12. The battery module according to claim 11, wherein the battery module comprises two or more support members respectively provided at opposite sides of the secondary battery.

13. The battery module according to claim 1, wherein the terminal bus bar further includes a terminal part connected to an electrode terminal of the battery module and bent perpendicular to the plate-like coupling unit.

14. The battery module according to claim 1, wherein the secondary battery is a pouch-type secondary battery.

15. The battery module according to claim 14, wherein the electrode leads of the pouch-type secondary battery includes a positive electrode lead and a negative electrode lead which protrude in opposite directions.

16. A battery pack, comprising the battery module defined in claim 1.

17. A vehicle, comprising the battery module defined in claim 1.

* * * * *